United States Patent
Kim et al.

(10) Patent No.: US 11,078,360 B2
(45) Date of Patent: Aug. 3, 2021

(54) POLYCARBONATE/POLYCARBONATE-POLYSILOXANE COMPOSITION

(71) Applicant: Lotte Advanced Materials Co., Ltd., Yeosu-si (KR)

(72) Inventors: Nam Hyun Kim, Uiwang-si (KR); Young Mi Kim, Uiwang-si (KR); Bong Jae Lee, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 49 days.

(21) Appl. No.: 16/520,540

(22) Filed: Jul. 24, 2019

(65) Prior Publication Data
US 2020/0032052 A1 Jan. 30, 2020

(30) Foreign Application Priority Data
Jul. 26, 2018 (KR) .................. 10-2018-0087132

(51) Int. Cl.
| | | |
|---|---|---|
| *C08L 69/00* | (2006.01) | |
| *C08L 67/02* | (2006.01) | |
| *C08L 83/04* | (2006.01) | |
| *C08L 83/10* | (2006.01) | |
| *C08G 64/18* | (2006.01) | |

(52) U.S. Cl.
CPC ............ *C08L 69/00* (2013.01); *C08G 64/186* (2013.01); *C08L 67/02* (2013.01); *C08L 83/04* (2013.01); *C08L 83/10* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 8,304,494 B2 | 11/2012 | Park et al. | |
| 9,540,511 B2 | 1/2017 | Aoki | |
| 2008/0227896 A9 | 9/2008 | Ebeling et al. | |
| 2009/0088509 A1* | 4/2009 | Adoni ................. | C08G 77/448 524/417 |
| 2012/0252985 A1 | 10/2012 | Rosenquist et al. | |
| 2015/0307706 A1 | 10/2015 | Rosenquist et al. | |
| 2016/0319127 A1 | 11/2016 | Jeong et al. | |
| 2016/0326312 A1 | 11/2016 | Park et al. | |
| 2016/0326313 A1 | 11/2016 | Son et al. | |
| 2016/0326314 A1 | 11/2016 | Son et al. | |
| 2016/0326321 A1 | 11/2016 | Park et al. | |
| 2016/0369047 A1 | 12/2016 | Hwang et al. | |
| 2016/0369048 A1 | 12/2016 | Park et al. | |
| 2016/0369095 A1 | 12/2016 | Park et al. | |
| 2016/0376405 A1 | 12/2016 | Park et al. | |
| 2017/0137568 A1 | 5/2017 | Chun et al. | |
| 2017/0158852 A1 | 6/2017 | Ko et al. | |
| 2017/0190833 A1 | 7/2017 | Hwang et al. | |
| 2017/0275456 A1 | 9/2017 | Hwang et al. | |
| 2017/0292019 A1 | 10/2017 | Lee et al. | |
| 2017/0298221 A1 | 10/2017 | Son et al. | |
| 2017/0298222 A1 | 10/2017 | Lee et al. | |
| 2017/0306146 A1* | 10/2017 | Lee ..................... | C08K 5/521 |
| 2017/0321014 A1 | 11/2017 | Lee et al. | |
| 2018/0355178 A1* | 12/2018 | Yamada ................ | C08L 69/00 |

FOREIGN PATENT DOCUMENTS

| | | | |
|---|---|---|---|
| CN | 101056942 A | | 10/2007 |
| CN | 103443201 A | | 12/2013 |
| CN | 103857745 A | | 6/2014 |
| CN | 105899608 A | | 8/2016 |
| KR | 10-2010-0076643 A | | 7/2010 |
| KR | 10-2015-0125661 A | | 11/2015 |
| KR | 10-2018-0031474 A | | 3/2018 |
| TW | 201731952 A | | 9/2017 |
| WO | WO2013/051557 | * | 4/2013 |
| WO | WO2016/089138 | * | 6/2016 |

\* cited by examiner

*Primary Examiner* — David J Buttner
(74) *Attorney, Agent, or Firm* — Additon, Pendleton & Witherspoon, P.A.

(57) ABSTRACT

A thermoplastic resin composition and a molded article formed using the same. The thermoplastic resin composition includes: a polycarbonate resin; a first polycarbonate-polysiloxane copolymer resin; a second polycarbonate-polysiloxane copolymer resin; and a glycol-modified polyester resin, wherein the first polycarbonate-polysiloxane copolymer resin includes a polysiloxane block having an average degree of polymerization of about 30 to about 45 and the second polycarbonate-polysiloxane copolymer resin includes a polysiloxane block having an average degree of polymerization of about 70 to about 100. The thermoplastic resin composition can have good properties in terms of transparency, impact resistance, chemical resistance, and/or hydrolysis resistance.

8 Claims, No Drawings

POLYCARBONATE/POLYCARBONATE-POLYSILOXANE COMPOSITION

CROSS-REFERENCE TO RELATED APPLICATION

This application claims priority, under 35 USC Section 119, to Korean Patent Application No. 10-2018-0087132, filed Jul. 26, 2018, the entire disclosure of which is incorporated herein by reference.

FIELD

The present invention relates to a thermoplastic resin composition and a molded article manufactured using the same.

BACKGROUND

Polycarbonate resins have good properties in terms of impact resistance, toughness, transparency, thermal stability, self-extinguishability and dimensional stability, and are used as materials for electric/electronic products, automobile parts, lenses and glass substitute materials. However, when used as a material for products requiring transparency, typical polycarbonate resins exhibit considerably poor scratch resistance, as compared with glass.

Accordingly, such a polycarbonate resin is subjected to clear-coating to prevent generation of scratches in an actual use or to realize various colors, or subjected to painting after injection molding to secure good appearance characteristics. In this process, a coating solution, paint, or the like is diluted with various organic solvents and then is applied to a surface of a resin product, followed by drying. However, the organic solvents used as a diluent can penetrate the polycarbonate resin, causing deterioration in transparency and mechanical properties.

Therefore, there is a need for a thermoplastic resin composition which has good properties in terms of transparency, impact resistance, chemical resistance, hydrolysis resistance, and balance therebetween.

SUMMARY OF THE INVENTION

The present disclosure relates to a thermoplastic resin composition which can have good properties in terms of transparency, impact resistance, chemical resistance, and/or hydrolysis resistance, and a molded article formed of the same.

The thermoplastic resin composition includes: a polycarbonate resin; a first polycarbonate-polysiloxane copolymer resin; a second polycarbonate-polysiloxane copolymer resin; and a glycol-modified polyester resin, wherein the first polycarbonate-polysiloxane copolymer resin includes a polysiloxane block having an average degree of polymerization of about 30 to about 45 and the second polycarbonate-polysiloxane copolymer resin includes a polysiloxane block having an average degree of polymerization of about 70 to about 100.

The thermoplastic resin composition may include: about 35 wt % to about 55 wt % of the polycarbonate resin; about 25 wt % to about 45 wt % of the first polycarbonate-polysiloxane copolymer resin; about 5 wt % to about 25 wt % of the second polycarbonate-polysiloxane copolymer resin; and about 0.1 wt % to about 10 wt % of the glycol-modified polyester resin.

A weight ratio of the first polycarbonate-polysiloxane copolymer resin to the second polycarbonate-polysiloxane copolymer resin may range from about 1:0.2 to about 1:0.7.

The first polycarbonate-polysiloxane copolymer resin may include about 1 wt % to about 10 wt % of the polysiloxane block and about 90 wt % to about 99 wt % of a polycarbonate block.

The second polycarbonate-polysiloxane copolymer resin may include about 1 wt % to about 10 wt % of the polysiloxane block and about 90 wt % to about 99 wt % of a polycarbonate block.

Each of the first polycarbonate-polysiloxane copolymer resin and the second polycarbonate-polysiloxane copolymer resin may have a weight average molecular weight of about 15,000 g/mol to about 50,000 g/mol.

The glycol-modified polyester resin may have a 1,4-cyclohexane dimethanol (CHDM) content of about 20 mol % to about 100 mol % in a diol component.

The thermoplastic resin composition may have a haze of about 6.5% or less, as measured on a 2.5 mm thick specimen in accordance with ASTM D1003, and a light transmittance of about 90% or more, as measured on a 1.0 mm thick specimen in accordance with ASTM D1003.

The thermoplastic resin composition may have a notched Izod impact strength of about 60 kgf·cm/cm to about 100 kgf·cm/cm, as measured on a ⅛" thick specimen in accordance with ASTM D256.

The thermoplastic resin composition may have an impact strength of about 50 cm to 90 cm, as measured on a 2 mm thick specimen using a drop impact tester in accordance with the Dupont drop test by dipping the specimen in a thinner solution for 2.5 minutes, drying the specimen at 80° C. for 20 minutes, allowing the specimen to be left at room temperature for 24 hours, and measuring a height from which dropping a 500 g dart results in breakage of the specimen.

The thermoplastic resin composition may have a tensile strength retention rate of about 80% or more, as calculated according to Equation 1:

$$\text{Tensile strength retention rate (\%)} = (TS_1/TS_0) \times 100 \quad \text{[Equation 1]}$$

where $TS_0$ denotes an initial tensile strength of a 3.2 mm thick specimen, as measured at a tensile rate of 50 mm/min in accordance with ASTM D638, and $TS_1$ denotes a tensile strength of the specimen, as measured at a tensile rate of 50 mm/min in accordance with ASTM D638 after allowing the specimen to be left in a chamber at 85° C. and 85% RH for 120 hours.

The present disclosure also relates to a molded article. The molded article is formed of the thermoplastic resin composition set forth above.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present invention includes: (A) a polycarbonate resin; (B) a first polycarbonate-polysiloxane copolymer resin; (C) a second polycarbonate-polysiloxane copolymer resin; and (D) a glycol-modified polyester resin.

As used herein to represent a specific numerical range, the expression "a to b" means "≥a and ≤b".

(A) Polycarbonate Resin

The polycarbonate resin according to embodiments of the present disclosure may be a polycarbonate resin used in typical thermoplastic resin compositions. For example, the polycarbonate resin may be an aromatic polycarbonate resin prepared by reacting a precursor such as phosgene, halogen formate, and carbonic diester with diphenols (aromatic diol compounds).

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, and/or 2,2-bis(3,5-dimethyl-4-hydroxyphenyl)propane, and/or the like, and/or combinations and/or mixtures thereof, without being limited thereto. For example, the diphenols may include 2,2-bis-(4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and/or 1,1-bis(4-hydroxyphenyl)cyclohexane, for example 2,2-bis-(4-hydroxyphenyl)propane, which is also referred to as bisphenol A.

The polycarbonate resin may include a branched polycarbonate resin. For example, the polycarbonate resin may be a branched polycarbonate resin prepared by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may include a homopolycarbonate resin, a copolycarbonate resin, or a blend thereof. In addition, the polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) of about 20,000 g/mol to about 50,000 g/mol, for example, about 25,000 g/mol to about 40,000 g/mol, as measured by gel permeation chromatography (GPC). Within this range, the thermoplastic resin composition can have good properties in terms of impact resistance, flowability (processability), and the like.

The polycarbonate resin may be present in an amount of about 35 wt % to about 55 wt %, for example, about 38 wt % to about 53 wt %, based on the total weight (100 wt %) of the thermoplastic resin composition. In some embodiments, the thermoplastic resin composition can include the polycarbonate resin in an amount of about 35, 36, 37, 38, 39, 40, 41, 42, 43, 44, 45, 46, 47, 48, 49, 50, 51, 52, 53, 54, or 55 wt % based on 100 wt % of the thermoplastic resin composition. Further, according to some embodiments, the polycarbonate resin may be present in an amount of from about any of the foregoing amounts to about any other of the foregoing amounts.

Within this range, the thermoplastic resin composition can have good properties in terms of transparency, impact resistance, and the like.

(B) First Polycarbonate-Polysiloxane Copolymer Resin

The first polycarbonate-polysiloxane copolymer resin according to embodiments of the present disclosure can serve to improve impact resistance, chemical resistance, and hydrolysis resistance of the thermoplastic resin composition with minimal or no deterioration in transparency in conjunction with the second polycarbonate-polysiloxane copolymer resin and the glycol-modified polyester resin, and includes a polycarbonate block and a polysiloxane block having an average degree of polymerization of about 30 to about 45, for example about 35 to about 40. In some embodiments, the polysiloxane block of the first polycarbonate-polysiloxane copolymer resin may have an average degree of polymerization of about 30, 31, 32, 33, 34, 35, 36, 37, 38, 39, 40, 41, 42, 43, 44, or 45.

If the average degree of polymerization of the polysiloxane block is less than about 30, the thermoplastic resin composition can have poor properties in terms of impact resistance, chemical resistance, and the like, whereas, if the average degree of polymerization of the polysiloxane block exceeds about 45, the thermoplastic resin composition can have poor properties in terms of transparency and the like.

The polycarbonate block may include a structural unit derived from a polycarbonate resin such as described above with respect to the polycarbonate resin (A), for example, can be a structural unit derived from a polycarbonate resin which is the same as the polycarbonate resin (A), and the polysiloxane block may include a structural unit represented by Formula 1:

[Formula 1]

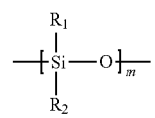

wherein $R_1$ and $R_2$ are each independently a hydrogen atom, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_3$ to $C_{30}$ cycloalkyl group, a $C_3$ to $C_{30}$ cycloalkenyl group, a $C_3$ to $C_{30}$ cycloalkynyl group, a $C_6$ to $C_{30}$ aryl group, a $C_6$ to $C_{30}$ aryloxy group, or NRR' (wherein R and R' are each independently a hydrogen atom or a $C_1$ to $C_{20}$ alkyl group), and m (average degree of polymerization) ranges from about 30 to about 45.

The first polycarbonate-polysiloxane copolymer resin may be prepared by any typical polycarbonate-polysiloxane copolymer preparation method known in the art. For example, the first polycarbonate-polysiloxane copolymer resin may be prepared by reacting a polysiloxane containing the structural unit represented by Formula 1 and diphenols (aromatic diol compounds) with a precursor such as phosgene, halogen formate, or carbonic diester. Here, reaction may be carried out by any typical polymerization method such as interfacial polymerization and melt polymerization, for example, interfacial polymerization using phosgene.

The first polycarbonate-polysiloxane copolymer resin may include about 1 wt % to about 10 wt %, for example, about 1 wt % to about 7 wt %, and as another example about 4 wt % to about 6 wt %, of the polysiloxane block and about 90 wt % to about 99 wt %, for example, about 93 to about 99 wt %, and as another example about 94 wt % to about 96 wt %, of the polycarbonate block. Within these ranges, the thermoplastic resin composition can have good properties in terms of impact resistance, transparency, and the like.

In some embodiments, the first polycarbonate-polysiloxane copolymer resin may include the polysiloxane block in an amount of about 1, 2, 3, 4, 5, 6, 7, 8, 9, or 10 wt %, based on 100 wt % of the first polycarbonate-polysiloxane copolymer resin. Further, according to some embodiments, the polysiloxane block may be present in an amount of from about any of the foregoing amounts to about any other of the foregoing amounts.

In some embodiments, the first polycarbonate-polysiloxane copolymer resin may include the polycarbonate block in an amount of about 90, 91, 92, 93, 94, 95, 96, 97, 98, or 99 wt %, based on 100 wt % of the first polycarbonate-polysiloxane copolymer resin. Further, according to some embodiments, the polycarbonate block may be present in an amount of from about any of the foregoing amounts to about any other of the foregoing amounts.

The first polycarbonate-polysiloxane copolymer resin may have a weight average molecular weight (Mw) of about 15,000 g/mol to about 50,000 g/mol, for example, about 15,000 g/mol to about 40,000 g/mol, as measured by gel permeation chromatography (GPC). Within this range, the thermoplastic resin composition can have good properties in terms of impact resistance, flowability, and the like.

The first polycarbonate-polysiloxane copolymer resin may be present in an amount of about 25 wt % to about 45 wt %, for example, about 30 wt % to about 40 wt %, based on the total weight (100 wt %) of the thermoplastic resin composition. In some embodiments, the thermoplastic resin composition can include the first polycarbonate-polysiloxane copolymer resin in an amount of about 25, 26, 27, 28, 29, 30, 31, 32, 33, 34, 35, 36, 37, 38, 39, 40, 41, 42, 43, 44, or 45 wt % based on 100 wt % of the thermoplastic resin composition. Further, according to some embodiments, the first polycarbonate-polysiloxane copolymer resin may be present in an amount of from about any of the foregoing amounts to about any other of the foregoing amounts.

Within this range, the thermoplastic resin composition can have good properties in terms of transparency, impact resistance, chemical resistance, hydrolysis resistance, and the like.

(C) Second Polycarbonate-Polysiloxane Copolymer Resin

The second polycarbonate-polysiloxane copolymer resin according to embodiments of the present disclosure can serve to improve impact resistance, chemical resistance, and hydrolysis resistance of the thermoplastic resin composition with minimal or no deterioration in transparency in conjunction with the first polycarbonate-polysiloxane copolymer resin and the glycol-modified polyester resin, and includes a polycarbonate block and a polysiloxane block having an average degree of polymerization of about 70 to about 100, for example, about 75 to about 95. In some embodiments, the polysiloxane block of the second polycarbonate-polysiloxane copolymer resin may have an average degree of polymerization of about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

If the average degree of polymerization of the polysiloxane block is less than about 70, the thermoplastic resin composition can have poor properties in terms of impact resistance, chemical resistance, and the like, whereas, if the average degree of polymerization of the polysiloxane block exceeds about 100, the thermoplastic resin composition can have poor properties in terms of transparency, flowability, heat resistance, and the like.

The polycarbonate block may include a structural unit derived from a polycarbonate resin such as described above with respect to the polycarbonate resin (A), for example, can be a structural unit derived from a polycarbonate resin which is the same as the polycarbonate resin (A), and the polysiloxane block may include a structural unit represented by Formula 2:

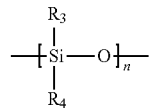

[Formula 2]

wherein $R_3$ and $R_4$ are each independently a hydrogen atom, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_3$ to $C_{30}$ cycloalkyl group, a $C_3$ to $C_{30}$ cycloalkenyl group, a $C_3$ to $C_{30}$ cycloalkynyl group, a $C_6$ to $C_{30}$ aryl group, a $C_6$ to $C_{30}$ aryloxy group, or NRR' (wherein R and R' are each independently a hydrogen atom or a $C_1$ to $C_{20}$ alkyl group), and n (average degree of polymerization) ranges from about 70 to about 100.

The second polycarbonate-polysiloxane copolymer resin may be prepared by any typical polycarbonate-polysiloxane copolymer preparation method known in the art. For example, the second polycarbonate-polysiloxane copolymer resin may be prepared by reacting a polysiloxane containing the structural unit represented by Formula 2 and diphenols (aromatic diol compounds) with a precursor such as phosgene, halogen formate, or carbonic diester. Here, reaction may be carried out by any typical polymerization method such as interfacial polymerization and melt polymerization, for example, interfacial polymerization using phosgene.

The second polycarbonate-polysiloxane copolymer resin may include about 1 wt % to about 10 wt %, for example, about 1 wt % to about 7 wt %, and as another example about 4 wt % to about 6 wt % of the polysiloxane block and about 90 wt % to about 99 wt %, for example, about 93 to about 99 wt %, and as another example about 94 wt % to about 96 wt % of the polycarbonate block.

In some embodiments, the second polycarbonate-polysiloxane copolymer resin may include the polysiloxane block in an amount of about 1, 2, 3, 4, 5, 6, 7, 8, 9, or 10 wt %, based on 100 wt % of the second polycarbonate-polysiloxane copolymer resin. Further, according to some embodiments, the polysiloxane block may be present in an amount of from about any of the foregoing amounts to about any other of the foregoing amounts.

In some embodiments, the second polycarbonate-polysiloxane copolymer resin may include the polycarbonate block in an amount of about 90, 91, 92, 93, 94, 95, 96, 97, 98, or 99 wt %, based on 100 wt % of the second polycarbonate-polysiloxane copolymer resin. Further, according to some embodiments, the polycarbonate block may be present in an amount of from about any of the foregoing amounts to about any other of the foregoing amounts.

Within this range, the thermoplastic resin composition can have good properties in terms of impact resistance, transparency, and the like.

The second polycarbonate-polysiloxane copolymer resin may have a weight average molecular weight (Mw) of about 15,000 g/mol to about 50,000 g/mol, for example, about 15,000 g/mol to about 40,000 g/mol, as measured by gel permeation chromatography (GPC). Within this range, the thermoplastic resin composition can have good properties in terms of impact resistance, chemical resistance, and the like.

The second polycarbonate-polysiloxane copolymer resin may be present in an amount of about 5 wt % to about 25 wt %, for example, about 10 wt % to about 20 wt %, based on the total weight (100 wt %) of the thermoplastic resin composition. In some embodiments, the thermoplastic resin composition can include the second polycarbonate-polysiloxane copolymer resin in an amount of about 5, 6, 7, 8, 9, 10, 11, 12, 13, 14, 15, 16, 17, 18, 19, 20, 21, 22, 23, 24, or 25 wt %, based on 100 wt % of the thermoplastic resin composition. Further, according to some embodiments, the second polycarbonate-polysiloxane copolymer resin may be present in an amount of from about any of the foregoing amounts to about any other of the foregoing amounts.

Within this range, the thermoplastic resin composition can have good properties in terms of transparency, impact resistance, chemical resistance, hydrolysis resistance, and the like.

A weight ratio of the first polycarbonate-polysiloxane copolymer resin to the second polycarbonate-polysiloxane copolymer resin may range from about 1:0.2 to about 1:0.7, for example, about 1:0.25 to about 1:0.67. Within this range, the thermoplastic resin composition can have further improved properties in terms of transparency, impact resistance, and the like.

(D) Glycol-Modified Polyester Resin

The glycol-modified polyester resin according to embodiments of the present disclosure is a polyester resin having a 1,4-cyclohexane dimethanol (CHDM) content of about 20 mol % to 100 mol % in a diol component and serves to improve chemical resistance (post-painting impact resistance), and hydrolysis resistance of the thermoplastic resin composition with minimal or no deterioration in transparency and impact resistance, in conjunction with the first polycarbonate-polysiloxane copolymer resin and the second polycarbonate-polysiloxane copolymer resin.

The glycol-modified polyester resin may be prepared by polycondensation of a dicarboxylic acid component including terephthalic acid with a diol component including about 20 mol % to 100 mol %, for example about 35 mol % to 100 mol %, of CHDM and 0 wt % to about 80 wt %, for example, 0 wt % to about 65 wt %, of a $C_2$ to $C_6$ alkylene glycol. In this case, the thermoplastic resin composition can have good properties in terms of hydrolysis resistance, chemical resistance, and the like.

In some embodiments, the diol component can include CHDM in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %, based on 100 mol % of the diol component. In some embodiments, the diol component can include 100 mol % CHDM (the $C_2$ to $C_6$ alkylene glycol is not present). Further, according to some embodiments, CHDM may be present in an amount of from about any of the foregoing amounts to about any other of the foregoing amounts.

In some embodiments, the diol component can include the $C_2$ to $C_6$ alkylene glycol in an amount of 0 (the $C_2$ to $C_6$ alkylene glycol is not present), about 0 (the $C_2$ to $C_6$ alkylene glycol is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %, based on 100 mol % of the diol component. Further, according to some embodiments, the $C_2$ to $C_6$ alkylene glycol may be present in an amount of from about any of the foregoing amounts to about any other of the foregoing amounts.

The glycol-modified polyester resin may have an intrinsic viscosity of about 0.5 dl/g to about 0.8 dl/g, for example, about 0.55 dl/g to about 0.75 dl/g, as measured at 35° C. using an o-chlorophenol solution (concentration: 0.5 g/dl). Within this range, compatibility between the components of the thermoplastic resin composition can be improved and the thermoplastic resin composition can have good mechanical properties, moldability (appearance characteristics), hydrolysis resistance, and the like.

The glycol-modified polyester resin may be present in an amount of about 0.1 wt % to about 10 wt %, for example, about 0.5 wt % to about 7 wt %, based on the total weight (100 wt %) of the thermoplastic resin composition. In some embodiments, the thermoplastic resin composition can include the glycol-modified polyester resin in an amount of about 0.1, 0.2, 0.3, 0.4, 0.5, 0.6, 0.7, 0.8, 0.9, 1, 2, 3, 4, 5, 6, 7, 8, 9, or 10 wt %, based on 100 wt % of the thermoplastic resin composition. Further, according to some embodiments, the glycol-modified polyester resin may be present in an amount of from about any of the foregoing amounts to about any other of the foregoing amounts.

Within this range, the thermoplastic resin composition can have good properties in terms of transparency, impact resistance, chemical resistance, hydrolysis resistance, and the like.

The thermoplastic resin composition according to embodiments of the present disclosure may further include one or more additives. The additive may include any suitable additive used in typical thermoplastic resin compositions, without limitation. Examples of the additive may include without limitation release agents, lubricants, nucleating agents, plasticizers, heat stabilizers, photostabilizers, flame retardants, flame retardant aids, anti-dripping agents, antioxidants, and the like, and mixtures thereof.

Examples of release agents can include without limitation polyethylene waxes, fluorine-containing polymers, silicone oils, metal salts of stearic acid, metal salts of montanic acid, and/or montanic ester wax. Examples of nucleating agents can include without limitation clay and/or talc. Examples of antioxidants can include without limitation hindered phenol compounds. The additive may be present in an amount of about 0.1 parts by weight to about 40 parts by weight relative to about 100 parts by weight of the thermoplastic resin composition, without being limited thereto.

The thermoplastic resin composition according to embodiments of the present disclosure may be prepared in pellet form by mixing the aforementioned components, followed by melt extrusion in a typical twin-screw type extruder at about 200° C. to about 280° C., for example, about 250° C. to about 260° C.

The thermoplastic resin composition may have a haze of about 6.5% or less, for example, about 3.5% to about 5.9%, as measured on a 2.5 mm thick specimen in accordance with ASTM D1003, and a light transmittance of about 90% or more, for example, about 90% to about 95%, as measured on a 1.0 mm thick specimen in accordance with ASTM D1003.

The thermoplastic resin composition may have a notched Izod impact strength of about 60 kgf·cm/cm to about 100 kgf·cm/cm, for example, about 70 kgf·cm/cm to about 90 kgf·cm/cm, as measured on a ⅛" thick specimen in accordance with ASTM D256.

The thermoplastic resin composition may have an impact strength of about 50 cm to 90 cm, for example, about 50 cm to about 85 cm, as measured on a 2 mm thick specimen using a drop impact tester in accordance with the Dupont drop test by dipping the specimen in a thinner solution for 2.5 minutes, drying the specimen at 80° C. for 20 minutes, allowing the specimen to be left at room temperature for 24 hours, and measuring a height from which dropping a 500 g dart results in breakage of the specimen.

The thermoplastic resin composition may have a tensile strength retention rate of about 80% or more, for example, about 80% to about 90%, as calculated according to Equation 1:

Tensile strength retention rate (%)=(TS$_1$/TS$_0$)×100    [Equation 1]

wherein TS$_0$ denotes an initial tensile strength of a 3.2 mm thick specimen, as measured at a tensile rate of 50 mm/min in accordance with ASTM D638, and TS$_1$ denotes a tensile strength of the specimen, as measured at a tensile rate of 50 mm/min in accordance with ASTM D638 after allowing the specimen to be left in a chamber at 85° C. and 85% relative humidity (RH) for 120 hours.

A molded article according to the present disclosure is formed of the thermoplastic resin composition set forth above. For example, the thermoplastic resin composition may be produced into the molded article by any known molding method such as injection molding, extrusion, vacuum molding, and/or casting, without limitation. Such molding methods are well known to those skilled in the art to which the present invention pertains. The molded article may be useful, without limitation, as an interior/exterior material for automobile parts and/or electric/electronic products due to good properties in terms of transparency, impact resistance, chemical resistance, hydrolysis resistance, and balance therebetween. For example, the molded article may be used as an interior/exterior material for mobile phones, laptops, and the like, which require a painting process such as clear-coating.

Next, the present invention will be described in more detail with reference to the following examples. It should be understood that these examples are provided for illustration only and are not to be in any way construed as limiting the present invention.

Example

Details of each component used in Examples and Comparative Examples are as follows:

(A) Polycarbonate Resin

A bisphenol-A polycarbonate resin (weight average molecular weight: 25,000 g/mol)

(B) First Polycarbonate-Polysiloxane Copolymer Resin

A polycarbonate-polysiloxane copolymer resin (FC1760, Idemitsu Kosan Co., Ltd., average degree of polymerization of polysiloxane block: 40, polysiloxane block: 6 wt %, polycarbonate block 94 wt %, weight average molecular weight: 21,000 g/mol).

(C) Second Polycarbonate-Polysiloxane Copolymer Resin

A polycarbonate-polysiloxane copolymer resin (FG1760, Idemitsu Kosan Co., Ltd., average degree of polymerization of polysiloxane block: 90, polysiloxane block: 6 wt %, polycarbonate block 94 wt %, weight average molecular weight: 21,000 g/mol).

(D) Glycol-Modified Polyester Resin

A glycol-modified polyester resin (PURATAN 0502, SK Chemicals, 1,4-cyclohexane dimethanol (CHDM) content in diol component: 100 mol %, dicarboxylic acid component: terephthalic acid, diol component: CHDM, intrinsic viscosity: 0.65 dl/g)

(E) Polycarbonate-Polysiloxane Copolymer Resin

A polycarbonate-polysiloxane copolymer resin (average degree of polymerization of polysiloxane block: 60, polysiloxane block: 6 wt %, polycarbonate block 94 wt %, weight average molecular weight: 21,000 g/mol).

Examples 1 to 7 and Comparative Examples 1 to 6

The aforementioned components are mixed in amounts as listed in Tables 1 and 2, followed by extrusion at 250° C., thereby preparing a thermoplastic resin composition in pellet form. Here, extrusion is performed using a twin-screw extruder (L/D: 36, (1): 45 mm). The prepared pellets are dried at 100° C. for 4 hours or more and then subjected to injection molding using a 6 oz. injection machine (molding temperature: 300° C.), thereby preparing a specimen. The prepared specimen is evaluated as to the following properties. Results are shown in Tables 1 and 2.

Property Evaluation (1) Haze (unit: %): Haze is measured on a 1.0 mm thick specimen and a 2.5 mm thick specimen using a haze meter (NDH 5000W, NIPPON DENSHOKU) in accordance with ASTM D1003.

(2) Light transmittance (unit: %): Total light transmittance is measured on a 1.0 mm thick specimen using a haze meter (NDH 5000W, NIPPON DENSHOKU) in accordance with ASTM D1003.

(3) Notched Izod impact strength (unit: kgf·cm/cm): Notched Izod impact strength is measured on a ⅛" thick Izod specimen in accordance with ASTM D256.

(4) Chemical resistance (post-painting impact resistance): A 2 mm thick specimen is dipped in a thinner solution for 2.5 minutes, dried at 80° C. for 20 minutes, and allowed to be left at room temperature for 24 hours, followed by measurement of a height (unit: cm) from which dropping a 500 g dart results in breakage of the specimen using a drop impact tester in accordance with the Dupont drop test.

(5) Hydrolysis resistance (tensile strength retention rate): Tensile strength retention rate is calculated according to Equation 1:

Tensile strength retention rate (%)=(TS$_1$/TS$_0$)×100    [Equation 1]

wherein TS$_0$ denotes an initial tensile strength of a 3.2 mm thick specimen, as measured at a tensile rate of 50 mm/min in accordance with ASTM D638, and TS$_1$ denotes a tensile strength of the specimen, as measured at a tensile rate of 50 mm/min in accordance with ASTM D638 after allowing the specimen to be left in a chamber at 85° C. and 85% RH for 120 hours.

TABLE 1

|  |  | Example | | | | | | |
| --- | --- | --- | --- | --- | --- | --- | --- | --- |
|  |  | 1 | 2 | 3 | 4 | 5 | 6 | 7 |
| (A) (wt %) |  | 38 | 48 | 48 | 48 | 48 | 53 | 45 |
| (B) (wt %) |  | 40 | 40 | 35 | 32 | 30 | 30 | 32 |
| (C) (wt %) |  | 20 | 10 | 15 | 18 | 20 | 15 | 16 |
| (D) (wt %) |  | 2 | 2 | 2 | 2 | 2 | 2 | 7 |
| (E) (wt %) |  | — | — | — | — | — | — | — |
| Haze (%) | 1.0 mm | 1.8 | 1.7 | 1.9 | 1.8 | 2.4 | 1.8 | 1.7 |
|  | 2.5 mm | 5.8 | 4.4 | 5.0 | 5.9 | 5.9 | 5.2 | 4.9 |
| Light transmittance (%) |  | 90.4 | 91.5 | 91.4 | 90.9 | 90.2 | 91.0 | 90.5 |
| Notched Izod impact strength (kgf · cm/cm) |  | 80 | 71 | 75 | 78 | 83 | 75 | 77 |

TABLE 1-continued

|  | Example | | | | | | |
|---|---|---|---|---|---|---|---|
|  | 1 | 2 | 3 | 4 | 5 | 6 | 7 |
| Height resulting in breakage of specimen (cm) | 75 | 51 | 69 | 71 | 80 | 64 | 55 |
| Tensile strength retention rate (%) | 82 | 81 | 80 | 82 | 82 | 81 | 86 |

TABLE 2

|  |  | Comparative Example | | | | | |
|---|---|---|---|---|---|---|---|
|  |  | 1 | 2 | 3 | 4 | 5 | 6 |
| (A) (wt %) |  | 48 | 48 | 50 | 48 | 48 | 48 |
| (B) (wt %) |  | 50 | — | 40 | 35 | — | — |
| (C) (wt %) |  | — | 50 | 10 | — | 15 | — |
| (D) (wt %) |  | 2 | 2 | — | 2 | 2 | 2 |
| (E) (wt %) |  | — | — | — | 15 | 35 | 50 |
| Haze (%) | 1.0 mm | 1.7 | 3.5 | 1.7 | 1.9 | 2.6 | 3.4 |
|  | 2.5 mm | 4.8 | 10.2 | 4.5 | 4.9 | 5.2 | 9.8 |
| Light transmittance (%) |  | 91.5 | 85.8 | 91.5 | 91.2 | 87.5 | 86.2 |
| Notched Izod impact strength (kgf · cm/cm) |  | 71 | 88 | 85 | 75 | 75 | 80 |
| Height resulting in breakage of specimen (cm) |  | 25 | 72 | 40 | 18 | 19 | 69 |
| Tensile strength retention rate (%) |  | 76 | 85 | 69 | 81 | 82 | 82 |

From the results shown in Table 1, it can be seen that the thermoplastic resin composition according to the present disclosure (Examples 1 to 7) has good properties in terms of transparency, impact resistance, chemical resistance, hydrolysis resistance, and balance therebetween.

Conversely, the thermoplastic resin composition of Comparative Example 1, not including the second polycarbonate-polysiloxane copolymer resin (C), has poor properties in terms of chemical resistance (post-painting impact resistance) and hydrolysis resistance; the thermoplastic resin composition of Comparative Example 2, not including the first polycarbonate-polysiloxane copolymer resin (B), has poor properties in terms of transparency (haze, light transmittance); and the thermoplastic resin composition of Comparative Example 3, not including the glycol-modified polyester resin (D), has poor properties in terms of chemical resistance (post-painting impact resistance) and hydrolysis resistance. In addition, the thermoplastic resin composition of Comparative Example 4, using the polycarbonate-polysiloxane copolymer resin (E) including a polysiloxane block having an average degree of polymerization outside the range according to the present disclosure instead of the second polycarbonate-polysiloxane copolymer resin (C), has poor properties in terms of chemical resistance (post-painting impact resistance); the thermoplastic resin composition of Comparative Example 5, using the polycarbonate-polysiloxane copolymer resin (E) including a polysiloxane block having an average degree of polymerization outside the range according to the present disclosure instead of the first polycarbonate-polysiloxane copolymer resin (B), has poor properties in terms of chemical resistance (post-painting impact resistance) and transparency (light transmittance), and the thermoplastic resin composition of Comparative Example 6, using the polycarbonate-polysiloxane copolymer resin (E), including a polysiloxane block having an average degree of polymerization outside the range according to the present disclosure instead of the first polycarbonate-polysiloxane copolymer resin (B) and the second polycarbonate-polysiloxane copolymer resin (C), has poor properties in terms of transparency (haze, light transmittance).

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   about 35 wt % to about 55 wt % of a polycarbonate resin;
   about 25 wt % to about 45 wt % of a first polycarbonate-polysiloxane copolymer resin;
   about 5 wt % to about 25 wt % of a second polycarbonate-polysiloxane copolymer resin; and
   about 0.1 wt % to about 2 wt % of a glycol-modified polyester resin,
   wherein the first polycarbonate-polysiloxane copolymer resin comprises a polysiloxane block having an average degree of polymerization of about 30 to about 45 and the second polycarbonate-polysiloxane copolymer resin comprises a polysiloxane block having an average degree of polymerization of about 70 to about 100,
   wherein a weight ratio of the first polycarbonate-polysiloxane copolymer resin to the second polycarbonate-polysiloxane copolymer resin ranges from about 1:0.2 to about 1:0.7,
   wherein the glycol-modified polyester resin has a 1,4-cyclohexane dimethanol (CHDM) content of about 20 mol % to 100 mol % in a diol component, and
   wherein the thermoplastic resin composition has an impact strength of about 50 cm to 90 cm, as measured on a 2 mm thick specimen using a drop impact tester in accordance with the Dupont drop test by dipping the specimen in a thinner solution for 2.5 minutes, drying the specimen at 80° C. for 20 minutes, allowing the specimen to be left at room temperature for 24 hours, and measuring a height from which dropping a 500 g dart results in breakage of the specimen.

2. The thermoplastic resin composition according to claim 1, wherein the first polycarbonate-polysiloxane copolymer resin comprises about 1 wt % to about 10 wt % of the polysiloxane block and about 90 wt % to about 99 wt % of a polycarbonate block.

3. The thermoplastic resin composition according to claim 1, wherein the second polycarbonate-polysiloxane copolymer resin comprises about 1 wt % to about 10 wt % of the polysiloxane block and about 90 wt % to about 99 wt % of a polycarbonate block.

4. The thermoplastic resin composition according to claim 1, wherein each of the first polycarbonate-polysiloxane copolymer resin and the second polycarbonate-polysiloxane copolymer resin has a weight average molecular weight of about 15,000 g/mol to about 50,000 g/mol.

5. The thermoplastic resin composition according to claim 1, wherein the thermoplastic resin composition has a haze of about 6.5% or less, as measured on a 2.5 mm thick specimen in accordance with ASTM D1003, and a light transmittance of about 90% or more, as measured on a 1.0 mm thick specimen in accordance with ASTM D1003.

6. The thermoplastic resin composition according to claim 1, wherein the thermoplastic resin composition has a notched Izod impact strength of about 60 kgf·cm/cm to about 100 kgf·cm/cm, as measured on a ⅛" thick specimen in accordance with ASTM D256.

7. The thermoplastic resin composition according to claim 1, wherein the thermoplastic resin composition has a tensile strength retention rate of about 80% or more, as calculated according to Equation 1:

Tensile strength retention rate (%)=(TS$_1$/TS$_0$)×100   [Equation 1]

wherein TS$_0$ denotes an initial tensile strength of a 3.2 mm thick specimen, as measured at a tensile rate of 50 mm/min in accordance with ASTM D638, and TS$_1$ denotes a tensile strength of the thermoplastic resin composition, as measured at a tensile rate of 50 mm/min in accordance with ASTM D638 after leaving the specimen in a chamber at 85° C. and 85% relative humidity (RH) for 120 hours.

8. A molded article formed of the thermoplastic resin composition according to claim 1.

* * * * *